(12) United States Patent
Sura et al.

(10) Patent No.: US 9,150,152 B2
(45) Date of Patent: Oct. 6, 2015

(54) LIGHTED VEHICLE CARGO AREA ARRANGEMENT

(71) Applicant: Nissan North America, Inc., Franklin, TN (US)

(72) Inventors: Bhargav Sura, Sterling Heights, MI (US); Randall E. Johnson, White Lake, MI (US); Norbert Weinert, Troy, MI (US); Nelson Phan, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 274 days.

(21) Appl. No.: 13/693,389

(22) Filed: Dec. 4, 2012

(65) Prior Publication Data

US 2014/0153271 A1    Jun. 5, 2014

(51) Int. Cl.
*B60Q 1/00* (2006.01)
*B60Q 3/00* (2006.01)
*B60Q 3/06* (2006.01)

(52) U.S. Cl.
CPC ........................................ *B60Q 3/06* (2013.01)

(58) Field of Classification Search
CPC ...... B60Q 3/06; B60Q 1/2696; B60P 7/0815; B61D 45/001; F61B 37/045; F21S 48/2237
USPC .................. 362/485, 432, 430, 418
See application file for complete search history.

(56) References Cited

U.S. PATENT DOCUMENTS

| | | | |
|---|---|---|---|
| 4,182,532 A * | 1/1980 | Walker, Sr. | 296/210 |
| 4,692,845 A * | 9/1987 | Widhalm et al. | 362/485 |
| 4,779,168 A * | 10/1988 | Montgomery | 362/543 |
| 5,483,427 A | 1/1996 | Dealey, Jr. et al. | |
| 5,584,521 A * | 12/1996 | Hathaway et al. | 296/36 |
| 5,678,914 A | 10/1997 | Dealey et al. | |
| 5,795,051 A | 8/1998 | Galanski | |
| 6,152,586 A | 11/2000 | Dealey, Jr. et al. | |
| 6,238,068 B1 * | 5/2001 | Farmer, Jr. | 362/485 |
| 6,431,717 B1 | 8/2002 | Anderson et al. | |
| 6,481,871 B2 * | 11/2002 | Jamison | 362/287 |
| 6,644,829 B1 * | 11/2003 | Tracy et al. | 362/220 |
| 6,786,623 B2 | 9/2004 | Snyder et al. | |
| 6,927,540 B1 | 8/2005 | Zich | |
| 7,175,377 B2 | 2/2007 | Womack et al. | |
| 7,214,018 B2 | 5/2007 | Lussier | |
| 7,237,932 B2 | 7/2007 | Ter-Hovhannissian | |
| 7,303,320 B1 * | 12/2007 | Ashley | 362/493 |
| 7,658,524 B2 * | 2/2010 | Johnson et al. | 362/545 |

(Continued)

FOREIGN PATENT DOCUMENTS

WO    WO 2009065529 A1 *    5/2009

*Primary Examiner* — Evan Dzierzynski
*Assistant Examiner* — Tsion Tumebo
(74) *Attorney, Agent, or Firm* — Global IP Counselors, LLP

(57) ABSTRACT

A lighted vehicle cargo area arrangement includes a cargo area wall structure and a lighting system. The cargo area wall structure includes a first wall surface facing a vehicle cargo area. The lighting system includes a rail, a mounting bracket and a lamp. The rail is fixedly coupled to the cargo area wall structure and defines a lamp receiving space located laterally between an outboard surface of the rail and the first wall surface. The mounting bracket includes a rail attachment section rigidly attached to the rail and a lamp attachment section. The lamp is attached to the lamp attachment section. The lamp is aimed to shine light beneath the mounting bracket and the rail toward the vehicle cargo area.

19 Claims, 10 Drawing Sheets

(56) References Cited

U.S. PATENT DOCUMENTS

| | | |
|---|---|---|
| 7,819,566 B2 | 10/2010 | Kolstee et al. |
| 7,993,041 B2 | 8/2011 | Petelka |
| 8,192,064 B2 * | 6/2012 | Johnson et al. ............... 362/545 |
| 8,657,542 B2 * | 2/2014 | Liu et al. ....................... 410/106 |
| 2007/0103913 A1 * | 5/2007 | Lin ................................ 362/362 |
| 2007/0206386 A1 * | 9/2007 | Ehrlich et al. ................ 362/485 |
| 2009/0080995 A1 | 3/2009 | Peterson |
| 2009/0109696 A1 * | 4/2009 | Lembrick et al. ............ 362/485 |
| 2011/0140605 A1 | 6/2011 | Mann |
| 2012/0251261 A1 * | 10/2012 | Liu et al. ....................... 410/106 |
| 2014/0056014 A1 * | 2/2014 | Heaman et al. ............... 362/485 |

* cited by examiner

LIGHTED VEHICLE CARGO AREA ARRANGEMENT

BACKGROUND

1. Field of the Invention

The present invention generally relates to a lighted vehicle cargo area arrangement. More specifically, the present invention relates to a vehicle cargo area that includes a lighting arrangement that provides adjustable lighting to illuminate a floor and lower areas of the cargo area.

2. Background Information

Vehicle cargo areas, such as pickup truck cargo beds, are typically not provided with lighting. Thus it is difficult to see items on the floors of such cargo areas at night.

SUMMARY

One object is to provide a vehicle cargo area with a lighting arrangement.

Another object is to provide the vehicle cargo area with a flexible lighting arrangement where lamps can be positioned at a variety of locations within the cargo area.

In view of the state of the known technology, one aspect of the present disclosure is to provide a lighted vehicle cargo area arrangement that includes a cargo area wall structure and a lighting system. The cargo area wall structure includes a first wall surface facing a vehicle cargo area. The lighting system includes a rail, a mounting bracket and a lamp. The rail is fixedly coupled to the cargo area wall structure defining a lamp receiving space located laterally between an outboard surface of the rail and the first wall surface. The mounting bracket includes a rail attachment section rigidly attached to the rail and a lamp attachment section. The lamp is attached to the lamp attachment section and aimed to shine light beneath the mounting bracket and the rail toward the vehicle cargo area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
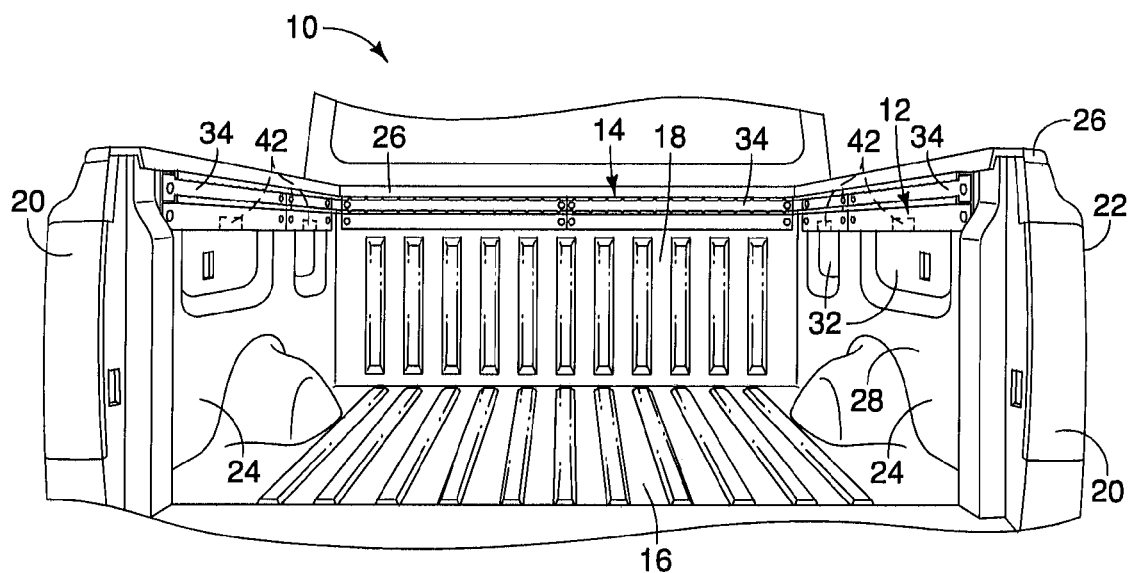
FIG. 1 is rear view of a vehicle cargo area that includes a wall structure facing the cargo area, a plurality of accessory mounting tracks mounted to the wall structure and a plurality of lighting systems mounted to respective hidden surfaces of the accessory mounting tracks in accordance with various embodiments.

Referring initially to FIG. 1, a vehicle 10 that includes a lighted vehicle cargo area arrangement with a lighting system 12 is illustrated in accordance with a first embodiment. The vehicle 10 includes a cargo area 14 having a floor 16, a front wall 18 and two side walls 20. The cargo area 14 also includes a tailgate (not shown). In the depicted embodiment, the vehicle 10 is a pickup truck and the cargo area 14 is the cargo bed of the pickup truck. However, it should be understood from the drawings and the description herein that the cargo area 14 and side walls 20 can be part of an enclosed cargo area of a van or enclosed truck structure.

Figure 2:
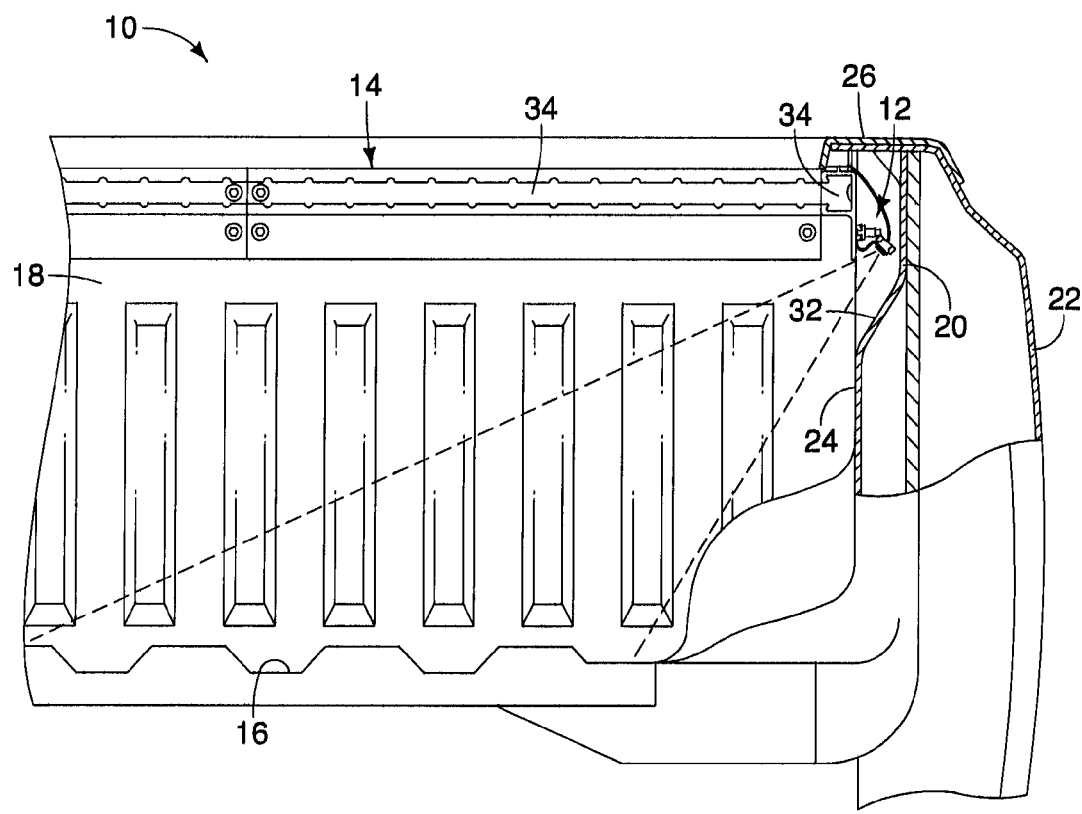
FIG. 2 is a rear end view of the wall structure showing one of the accessory mounting tracks and one of the plurality of lighting systems in accordance with the various embodiments.

The side walls 20 are symmetrical to one another but otherwise identical. Therefore, description of one applies equally to the other. As shown in FIG. 2, the side wall 20 has a wall structure that includes, for example, several sheet metal panels welded, riveted, fastened or otherwise rigidly fixed to one another to define the side wall 20. In the depicted arrangement, the panels that make up the wall structure of the side wall 20 provide one example of a wall structure that defines the side wall 20.

The side wall 20 includes at least an outboard panel 22, an inboard panel 24 and a top panel 26. However, the wall structure of the side wall 20 can include additional panels (not shown). The inboard panel 24 defines a first wall surface 28 that faces the cargo area 14. Specifically, the front wall 18 and each of the two side walls 20 at least partially surround and at least partially define the cargo area 14. The first wall surface 28 is an inboard facing surface of the side wall 20 directly facing the cargo area 14.

The first wall surface 28 of the side wall 20, as shown in FIG. 2, includes a plurality of a large concaved or recessed portions 32. In the depicted embodiment, there are two recessed portions 32.

Figure 4:
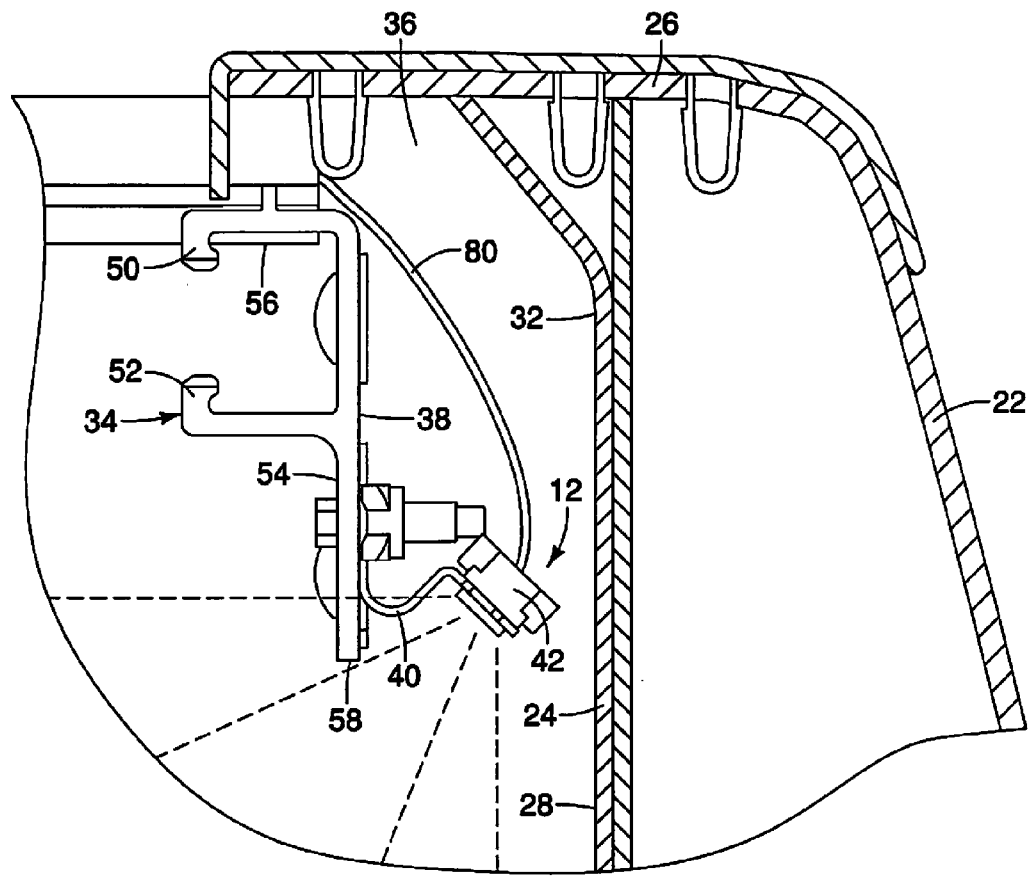
FIG. 4 is a rear cross-sectional end view of one of the accessory mounting tracks showing one of the lighting systems attached to the hidden surface in accordance with a first embodiment.

An accessory attachment track 34 (a rail that is described in greater detail below) is mounted proximate an upper end of the side wall 20. Portions of the accessory attachment track 34 are fixed to the side wall 20 in a conventional manner, by, for example, mechanical fasteners. However, the accessory attachment track 34 is spaced apart from those areas of the first wall surface 28 that define the recessed portions 32. As shown in FIG. 4, a lamp receiving space 36 is defined laterally between an outboard surface 38 of the accessory attachment track 34 and the first wall surface 28 along the recessed portion 32 of the side wall 20. The lamp receiving space 36 is further defined beneath the top panel 26.

Figure 3:
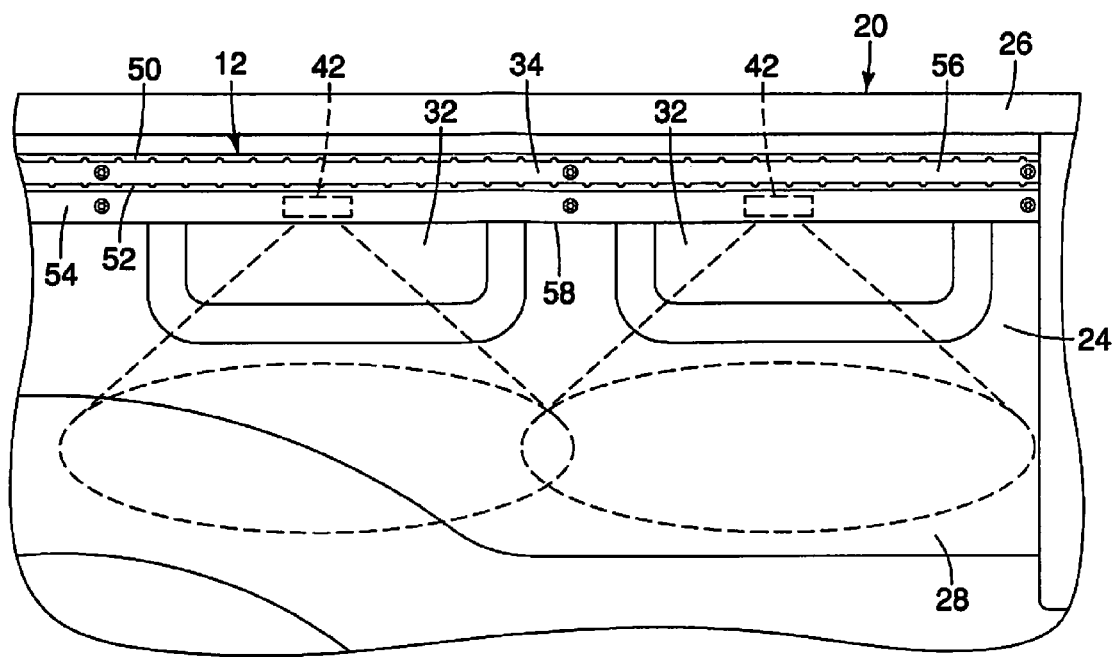
FIG. 3 is a view of the wall structure showing one of the accessory mounting tracks concealing the lighting systems in accordance with the various embodiments.

A description of a first embodiment of the lighting system 12 of the lighted vehicle cargo area arrangement is now provided with specific reference to FIGS. 2-10. As shown in FIGS. 2, 3 and 4, the lighting system 12 provides illumination to the floor 16 of the cargo area 14 and lower regions of the cargo area 14. In effect, the lighting system 12 provides indirect lighting to the cargo area 14 such that a person can see any objects located within the cargo area 14 in the dark, with a minimal amount of light shining outside the cargo area 14.

Figure 10:
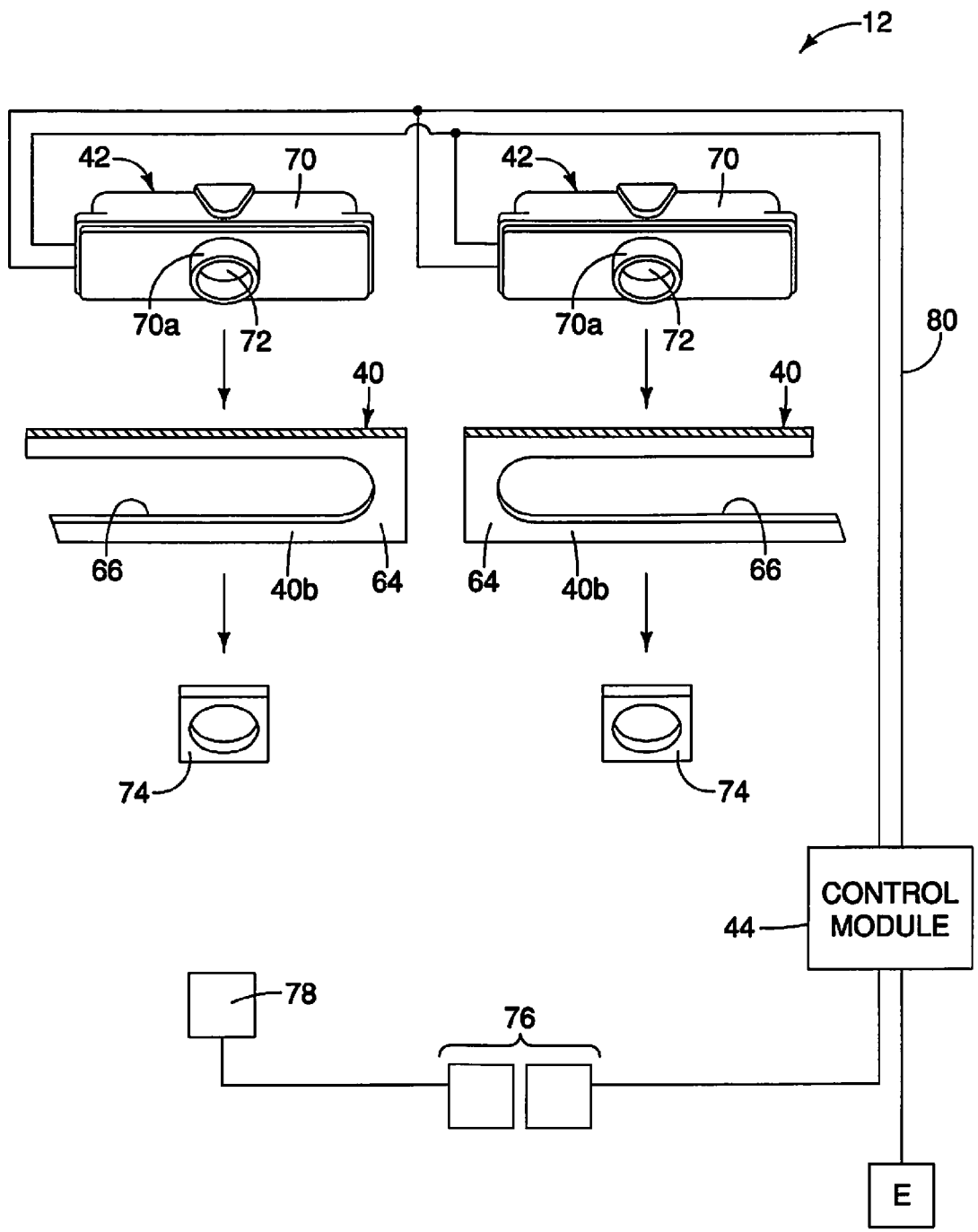
FIG. 10 is a schematic view of the lighting arrangement including the plurality of lighting systems electrically connected to a controller in accordance with the first embodiment.

The lighting system 12 basically includes the accessory attachment track 34, a mounting bracket 40, a plurality of lamp assemblies 42 and a controller 44 (shown in FIG. 10 only).

The accessory attachment track 34 is an elongated metallic member or rail that includes an upper section 50, a lower section 52 and a flange 54. The upper section 50 and lower section 52 are spaced apart from one another such that a slot 56 is defined between the upper section 50 and the lower section 52. The flange 54 extends below the lower section 52 and includes the outboard surface 38, mentioned above. Various accessories can be attached and removed from the accessory attachment track 34, as described in, for example, U.S. Pat. No. 7,874,774, issued Jan. 25, 2011, and U.S. Pat. No. 7,175,377, issued Feb. 13, 2007. Both U.S. Pat. Nos. 7,874,774 and 7,175,377 are incorporated herein by reference in their entirety.

The accessory attachment track 34 (the rail) is attached to the side wall 20 by conventional means, such as mechanical fasteners and/or rivets. The accessory attachment track 34 can alternatively be welded to the side wall 20. The above described outboard surface 38 is defined on the flange 54 and at least partially defines the lamp receiving space 36. The flange 54 also includes a lower edge 58 (FIGS. 3 and 4) that extends the horizontal length of the accessory attachment track 34.

Figure 5:
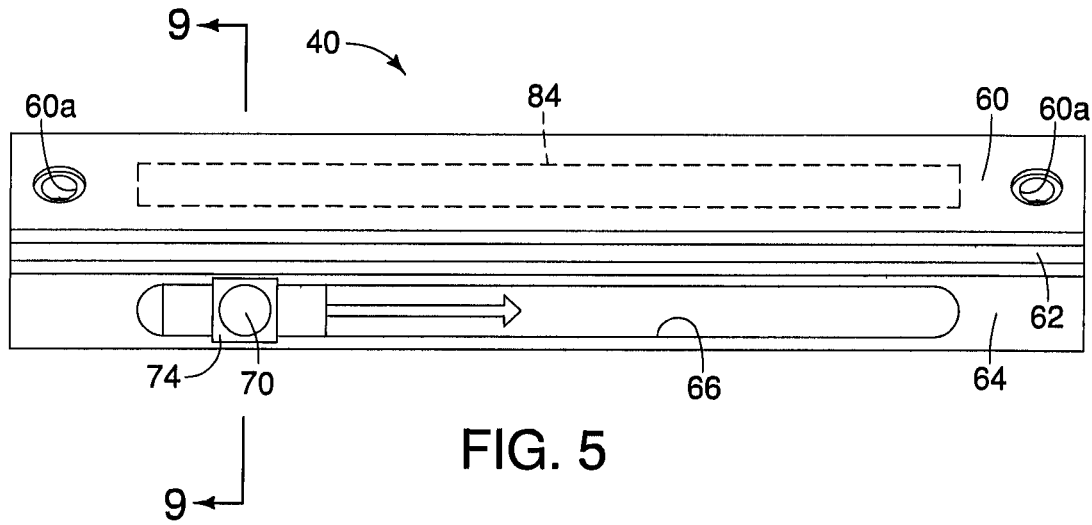
FIG. 5 is an inboard side view of a mounting bracket of the lighting system removed from the accessory mounting track showing mounting apertures and an elongated slot with a lamp assembly movably installed to the elongated slot at a first location in accordance with the first embodiment.
Figure 6:
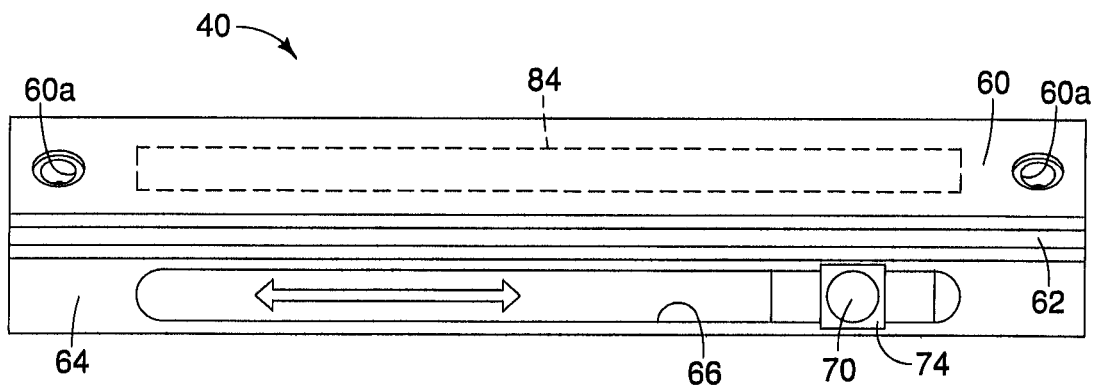
FIG. 6 is another inboard side view of the mounting bracket of the lighting system similar to FIG. 5, showing the lamp assembly movably installed to the elongated slot at a second location in accordance with the first embodiment.
Figure 9:
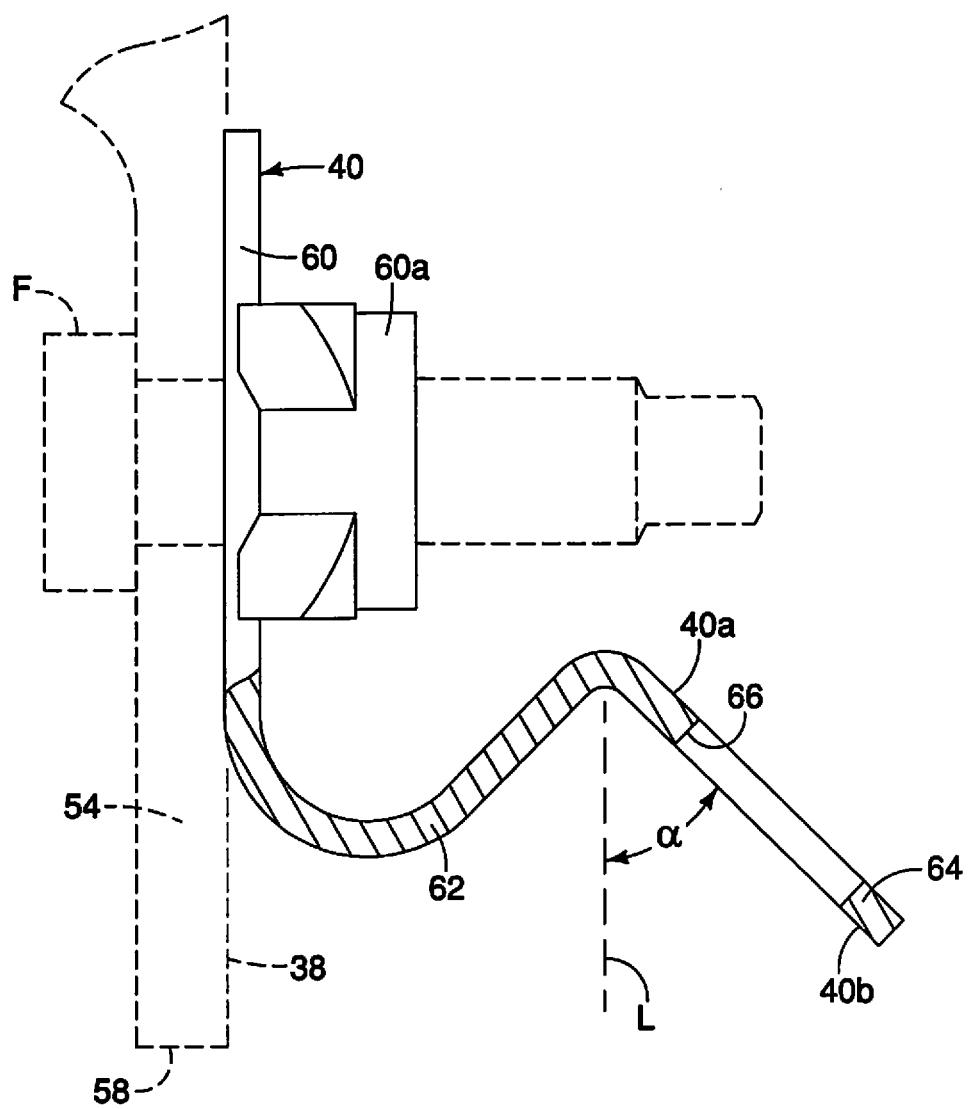
FIG. 9 is a cross-sectional view of the mounting bracket taken along the lines 9-9 in FIG. 5, with the accessory mounting track shown in phantom and the lamp assembly removed, showing a rail attachment section, a curved intermediate section and a lamp attachment section of the mounting bracket in accordance with the first embodiment.

As shown in FIGS. 5 and 6, the mounting bracket 40 can be an elongated member. As indicated in FIG. 9, the mounting bracket 40 is attached to the flange 54 along the outboard surface 38 (a hidden surface of the accessory attachment track 34). The mounting bracket 40 includes a rail attachment section 60, an intermediate section 62 and a lamp attachment section 64. The rail attachment section 60 is a generally flat section of the mounting bracket 40 and is rigidly attached to the flange 54 of the accessory attachment track 34 (the rail). The rail attachment section 60 extends in a downward direction along the accessory attachment track 34 (the rail) with the mounting bracket 40 installed thereto. The rail attachment section 60 can include two apertures with, for example, two threaded nuts 60a that are welded or otherwise fixed to the rail attachment section 60 proximate to the apertures. A pair of fasteners F (FIG. 9) can be installed through corresponding apertures in the flange 54 to attach the mounting bracket 40 to the accessory attachment track 34 (the rail).

The intermediate section 62 of the mounting bracket 40 extends upwardly from a lower end of the rail attachment section 60 toward the lamp attachment section 64. The intermediate section 62 of the mounting bracket 40 also extends away from the lower edge 58 of the accessory attachment track 34 with the mounting bracket 40 installed thereto. The intermediate section 62 further curves upward and away from the lower edge 58 of the accessory attachment track 34, and further extends toward the first wall surface 28 (see FIG. 4) and toward the lamp attachment section 64. The intermediate section 62 is further shaped to ensure that the lamp attachment section 64 and the lamp assembly 42 are completely disposed within the lamp receiving space 36, above the lower edge 58 of the flange 54 of the accessory attachment track 34 (the rail). Hence, the mounting bracket 40 and the lamp assembly 42 are disposed above a bottom-most end of the accessory attachment track 34 (the rail).

Figure 7:
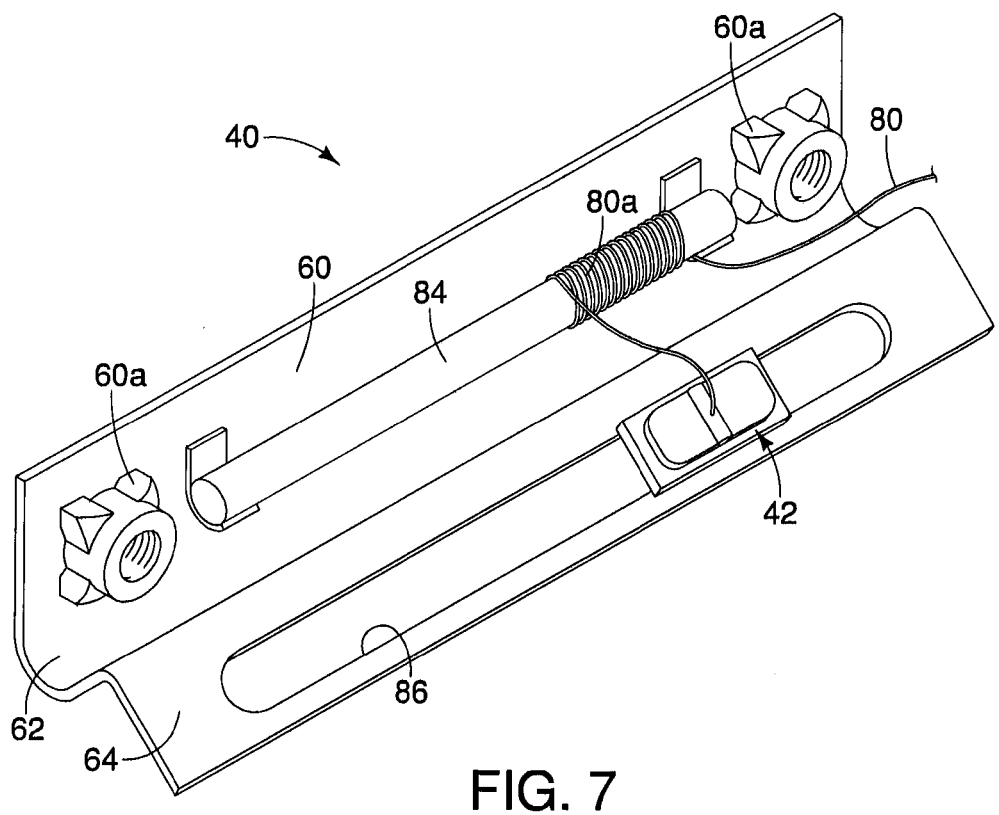
FIG. 7 is a perspective view of an outboard side of the mounting bracket of the lighting system showing the lamp assembly movably installed to the elongated slot at the first location and showing a retractable wiring harness in a retracted orientation in accordance with the first embodiment.
Figure 8:
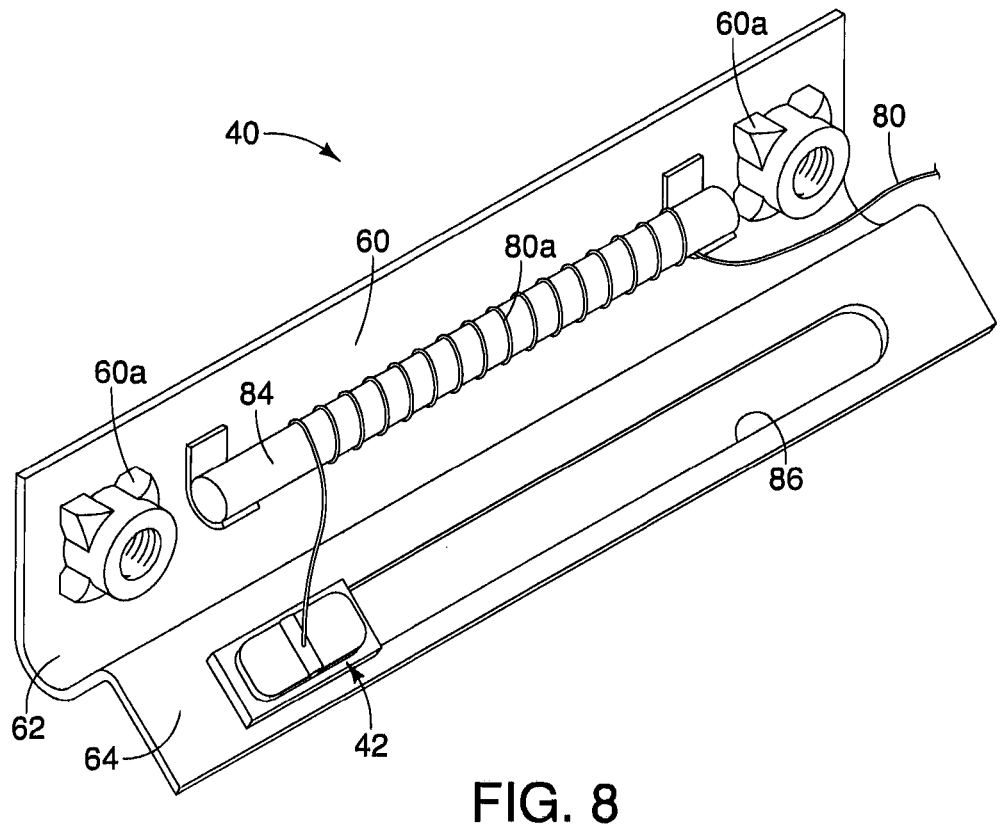
FIG. 8 is another perspective view of the outboard side of the mounting bracket of the lighting system showing the lamp assembly movably installed to the elongated slot at another location and showing the retractable wiring harness in an extended orientation in accordance with the first embodiment.

In the depicted first embodiment, the rail attachment section 60, the intermediate section 62 and the lamp attachment section 64 are rigidly fixed to one another and unitarily formed as a single monolithic element. Further, as shown in FIGS. 7-9, the rail attachment section 60 and the lamp attachment section 64 are angularly offset from one another defining an acute angle α therebetween. The line L in FIG. 9 is parallel to the rail attachment section 60. Thus the angle α represents the angle between rail attachment section 60 and the lamp attachment section 64. The angle α is approximately 45 degrees, but can be anywhere in a range from 30 degrees to 60 degrees.

The lamp attachment section 64 can include an elongated opening 66, shown in FIGS. 5-8.

The lighting system 12 can include a plurality of the mounting brackets 40 and a corresponding plurality of the lamp assemblies 42. Each mounting bracket 40 is identical to the other mounting brackets 40. Similarly, all the lamp assemblies 42 are the same. Therefore, description of one applies to all.

In FIG. 10, two of the mounting brackets 40 are depicted along with two of the lamp assemblies 42. Each lamp assembly 42 includes a lamp housing 70, a lamp 72 and an attachment member 74. The lamp housing 70 includes a tube-shaped projection 70a that is insert-able through the elongated opening 66 of the corresponding lamp attachment section 64 of the mounting bracket 40. The lamp 72 is a LED (light emitting diode) but can alternatively be a halogen or other conventional light providing element. The attachment member 74 can then be attached to the projection 70a, thereby retaining the lamp assembly 42 to the mounting bracket 40. In the depicted embodiment, the lamp housing 70 is located at an outboard side 40a of the mounting bracket 40 within the lamp receiving space 36, as shown in FIG. 4. The attachment member 74 is located on an inboard side 40b of the mounting bracket 40.

The attachment member 74 can attach to the projection 70a in any of a variety of ways. For example, the attachment member 74 can include threads (not shown) that engage corresponding threads (not shown) on the projection 70a. Alternatively, the attachment member 74 can include snap fitting projections (not shown) that engage corresponding recesses (not shown) on the projection 70a. Still further, the attachment member 74 can include one or more gripping projections (not shown) that simplify tightening or loosening of the attachment member 74 by a user (e.g., the attachment member 74 can be configured as a wing-nut). In other words, the lamp housing 70 can be installed to the mounting bracket 40 in any of a variety of ways that allow the lamp housing 70 be positioned at any one of a plurality of locations along a horizontal length of the lamp attachment section 64 of the mounting bracket 40.

The angle α (FIG. 9) between the lamp attachment section 64 and the rail attachment section 60 of the mounting bracket 40 ensures that the lamp 72 within the lamp housing 70 is aimed to shine light beneath the mounting bracket 40 and accessory attachment track 34 (the rail) toward the vehicle cargo area 14 and more specifically along the floor 16 of the cargo area 14.

As shown in FIGS. 7, 8 and 10, each of the lamp housings 70 is connected to the controller 44 via a wiring harness 80. The controller 44 can include a simple switch that allows an operator to mechanically turn the lamps 72 on and off. Further, the controller 44 can be programmed to detect the state of an engine E within the vehicle 10. Specifically, the controller 44 can detect whether or not the engine E is in a running condition. In the event that lighting of a cargo area is not permitted, the controller 44 limits operation of the lamps 72 to situation where the engine E is not running. If the controller 44 subsequently detects that the engine E is in a running condition, the lamps 72 can be automatically turned off.

The controller 44 can further be configured to operate within a voltage range that is lower than the standard 12 volt electric power supplied within a vehicle. For example, where power is to be conserved, the controller 44 and the lamps 72 can be designed to run on a reduced voltage. A power converter 76 can be installed between a power source 78 and the controller 44 to step down the voltage from the power source 78.

As shown in FIGS. 7 and 8, the lamp assembly 42 can be positioned at any of a plurality of locations along the elongated opening 66 (the slot). When the vehicle operator moves the lamp assembly 42 to a different location along the length of the elongated opening 66, the wiring harness 80 moves with the lamp assembly 42. The wiring harness 80 is provided with a coiled section 80a that is wrapped around a spindle 84. The spindle 84 is a fixed rod that is rigidly attached or mounted at either end to the outboard surface of the rail attachment section 60 of the mounting bracket 40, as shown in FIGS. 7 and 8.

The coiled section 80a of the wiring harness 80 is formed in a manner similar to a conventional telephone cord in that it is biased to remain in a coiled state and is further biased to move toward the coiled orientation or retracted orientation depicted in FIG. 7. Upon movement of the lamp assembly 42 to the location depicted in FIG. 8, the coils of the coiled section 80a of the wiring harness 80 are easily stretched such that adjacent coils separate from one another into an extended orientation as shown in FIG. 8. However, the coiled section 80a of the wiring harness 80 is biased to return toward the retracted orientation depicted in FIG. 7.

Second Embodiment

Figure 11:
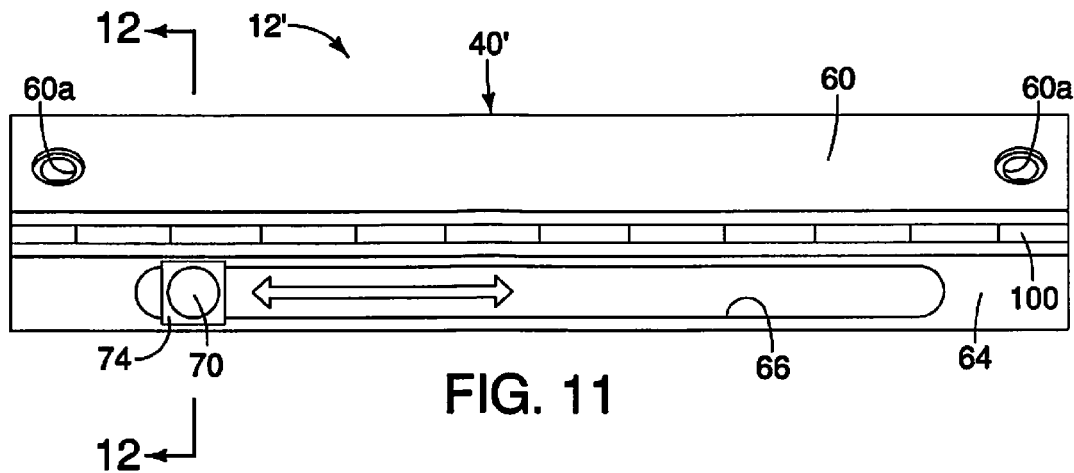
FIG. 11 is an inboard side view of a mounting bracket of a lighting system removed from the accessory mounting track showing mounting apertures, a hinge and an elongated slot with a lamp assembly movably installed to the elongated slot in accordance with a second embodiment.
Figure 12:
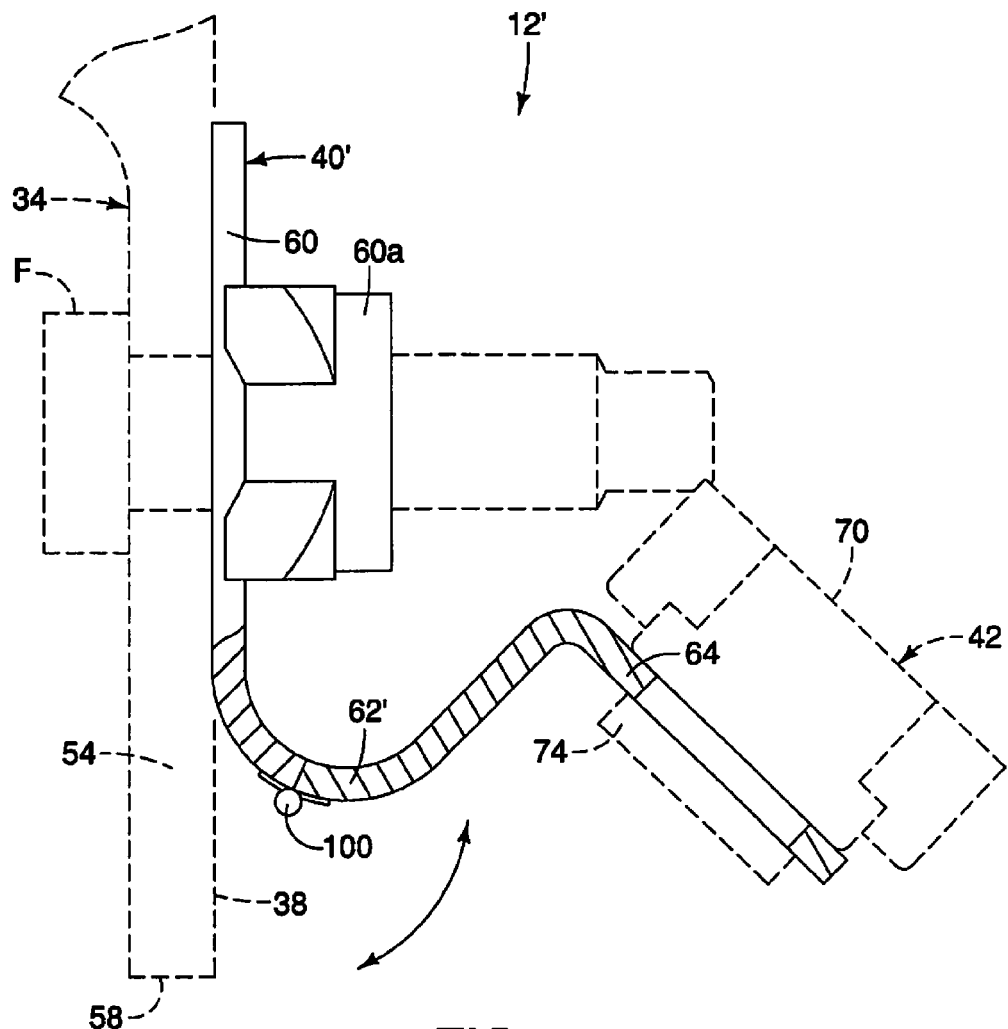
FIG. 12 is a cross-sectional view of the mounting bracket taken along the lines 12-12 in FIG. 11, showing a rail attachment section, a curved intermediate section that includes the hinge and a lamp attachment section in accordance with the second embodiment.

Referring now to FIGS. 11 and 12, a lighting system 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the accessory attachment track 34 is unaltered. However, in the second embodiment, the mounting bracket 40 is replaced with a mounting bracket 40' that includes the rail attachment section 60 and the lamp attachment section 64, as described with respect to the first embodiment above. However, the mounting bracket 40' includes an intermediate section 62' that is cut into two sections, when compared to the intermediate section 62 of the first embodiment, with a hinge 100 connecting the two sections of the intermediate section 62'. Hence, the lamp attachment section 64 can pivot relative to the rail attachment section 60. Thus, the lamp housing 70 can be pivoted and aimed where desired.

Third Embodiment

Figure 13:
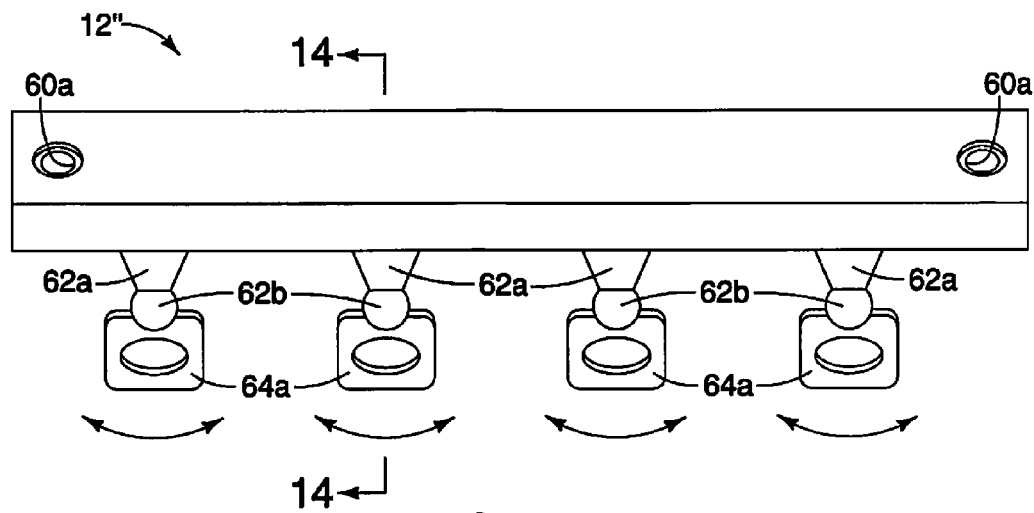
FIG. 13 is an inboard side view of a mounting bracket of a lighting system removed from the accessory mounting track showing mounting apertures and a swivel joint with a lamp assembly movably installed to the mounting bracket in accordance with a third embodiment.
Figure 14:
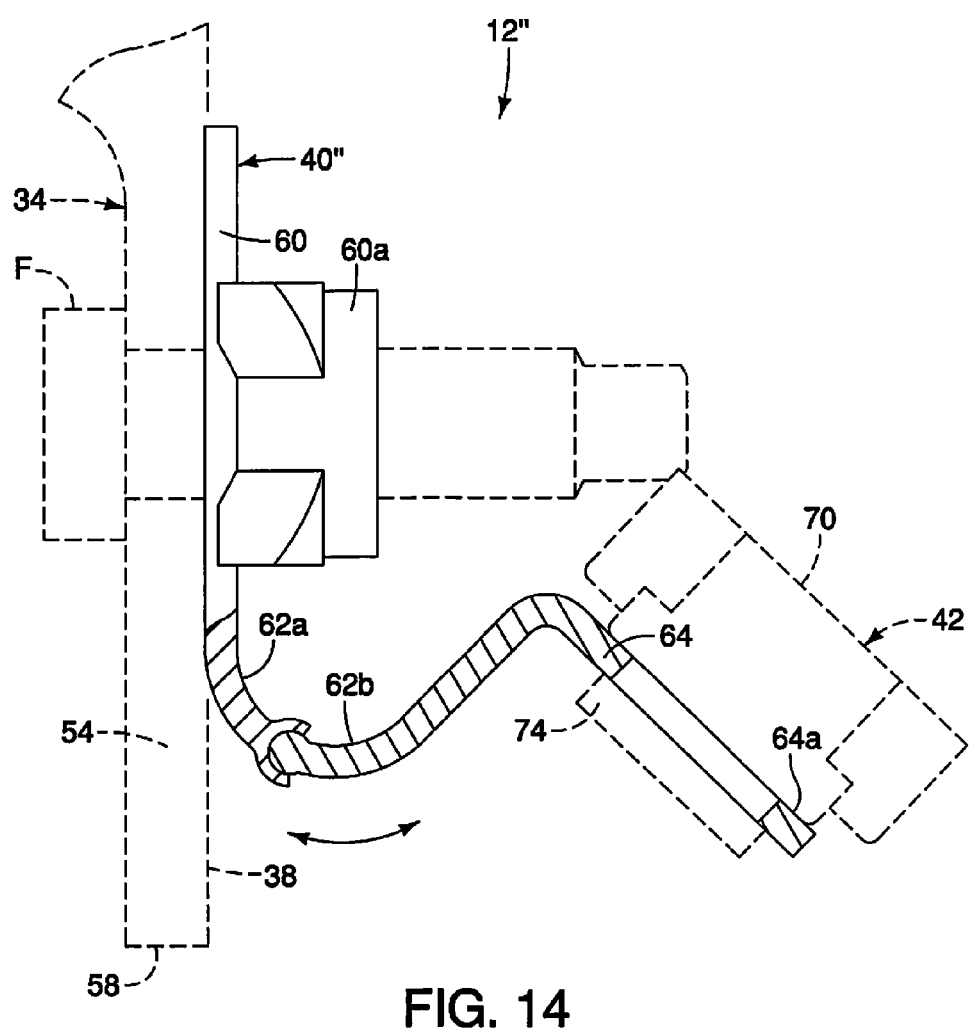
FIG. 14 is a cross-sectional view of the mounting bracket taken along the lines 14-14 in FIG. 13, showing a rail attachment section, a curved intermediate section and a lamp attachment section in accordance with the third embodiment.

Referring now to FIGS. 13 and 14, a lighting system 12" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the accessory attachment track 34 is unaltered. However, in the third embodiment, the mounting bracket 40 is replaced with a mounting bracket 40" that includes the rail attachment section 60 and the lamp attachment section 64, as described with respect to the first embodiment above. However, the mounting bracket 40" includes a plurality of intermediate sections, each one divided into a first part 62a and a second part 62b. Each of the first parts 62a includes a socket and each of the second parts 62b includes a ball. Hence, each first part 62a and corresponding second part 62b defines a swivel joint that allows the lamp attachment section 64 to freely pivot relative to the rail attachment section 60 in a variety of directions, limited only by the restrictions of the ball and socket of the swivel joint. Thus, the lamp housing 70 can be pivoted and swiveled about a center point defined between the first part 62 a and the second part 62b of the intermediate sections. Since such ball and socket swivel joints allow movement in a conventional manner, further description is omitted for the sake of brevity.

Fourth Embodiment

Figure 15:
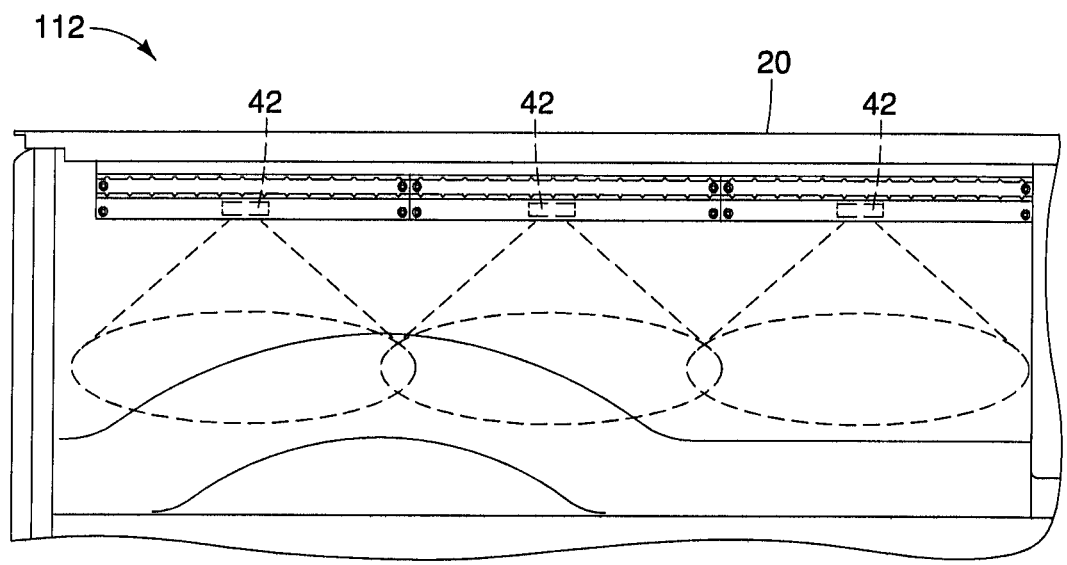
FIG. 15 is a view of the wall structure showing one of the accessory mounting tracks concealing a plurality lighting systems in accordance with a fourth embodiment.

Referring now to FIG. 15, a lighting system 112 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the first embodiment, each side wall 20 includes two of the lamp assemblies 42. However, for long bed cargo areas, it is possible to increase the number of lamp assemblies 42 included in the lighting system. In the fourth embodiment, the lighting system 112 includes three of the lamp assemblies 42 on each side wall 20.

Fifth Embodiment

Figure 16:
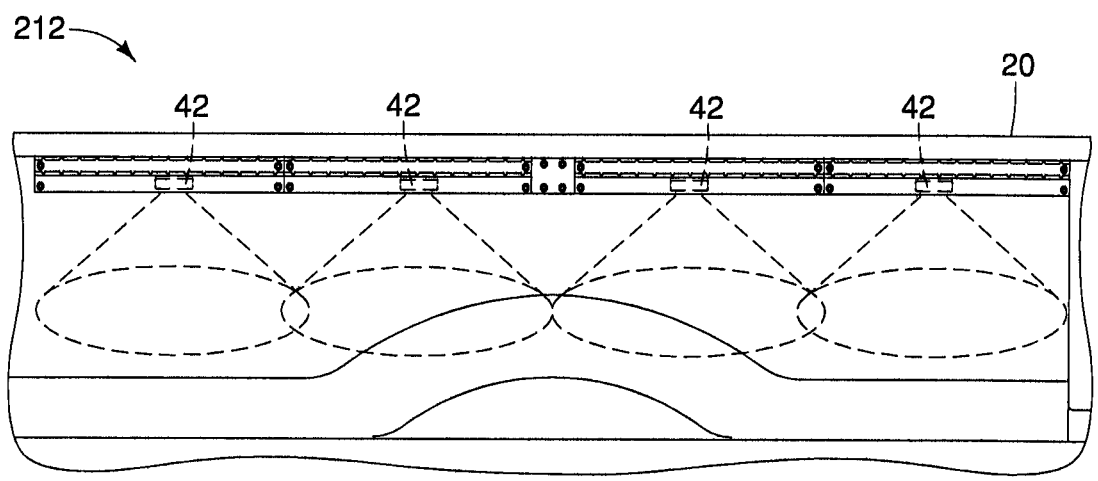
FIG. 16 is a view of the wall structure showing one of the accessory mounting tracks concealing a plurality lighting systems in accordance with a fifth embodiment.

Referring now to FIG. 16, a lighting system 212 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the first embodiment, each side wall 20 includes two of the lamp assemblies 42. However, for an extra-long bed cargo area, it is possible to increase the number of lamp assemblies 42 included in the lighting system. In the fifth embodiment, the lighting system 212 includes four of the lamp assemblies 42 on each side wall 20.

The controller 44 preferably includes a microcomputer with a lamp operating control program that controls the lamp assemblies 42, as discussed below. The controller 44 can also include other conventional components such as an input interface circuit, an output interface circuit, and storage devices such as a ROM (Read Only Memory) device and a RAM (Random Access Memory) device. The microcomputer of the controller 44 is programmed to control the lamp assemblies 42. The internal RAM of the controller 44 stores statuses of operational flags and various control data. The internal ROM of the controller 44 stores the control commands for various operations. It will be apparent to those skilled in the art from this disclosure that the precise structure and algorithms for the controller 44 can be any combination of hardware and software that will carry out the functions of the present invention.

The various portions of the vehicle 10 and cargo area 14 other than the lighting system 12 are conventional components that are well known in the art. Since vehicles and cargo areas are well known in the art, these structures will not be discussed or illustrated in detail herein. Rather, it will be apparent to those skilled in the art from this disclosure that the components can be any type of structure and/or programming that can be used to carry out the present invention.

Sixth Embodiment

Figure 17:
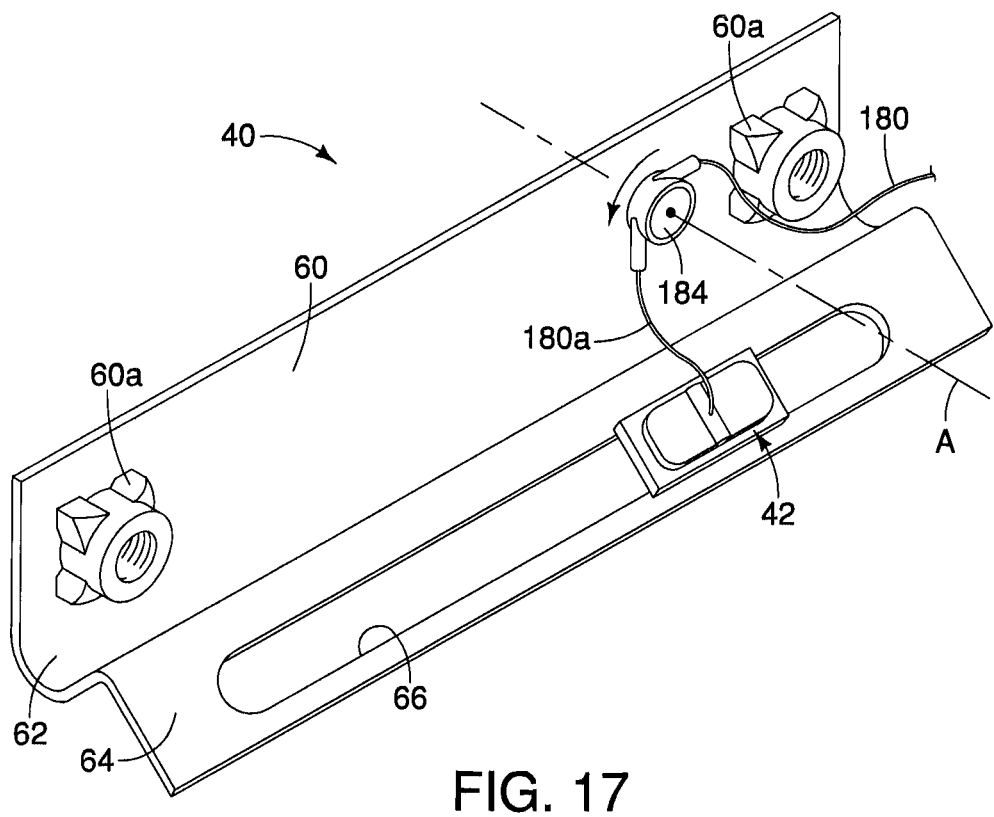
FIG. 17 is a perspective view of an outboard side of the mounting bracket of the lighting system showing the lamp assembly movably installed to the elongated slot at the first location and showing a retractable wiring harness in a retracted orientation in accordance with a sixth embodiment.
Figure 18:
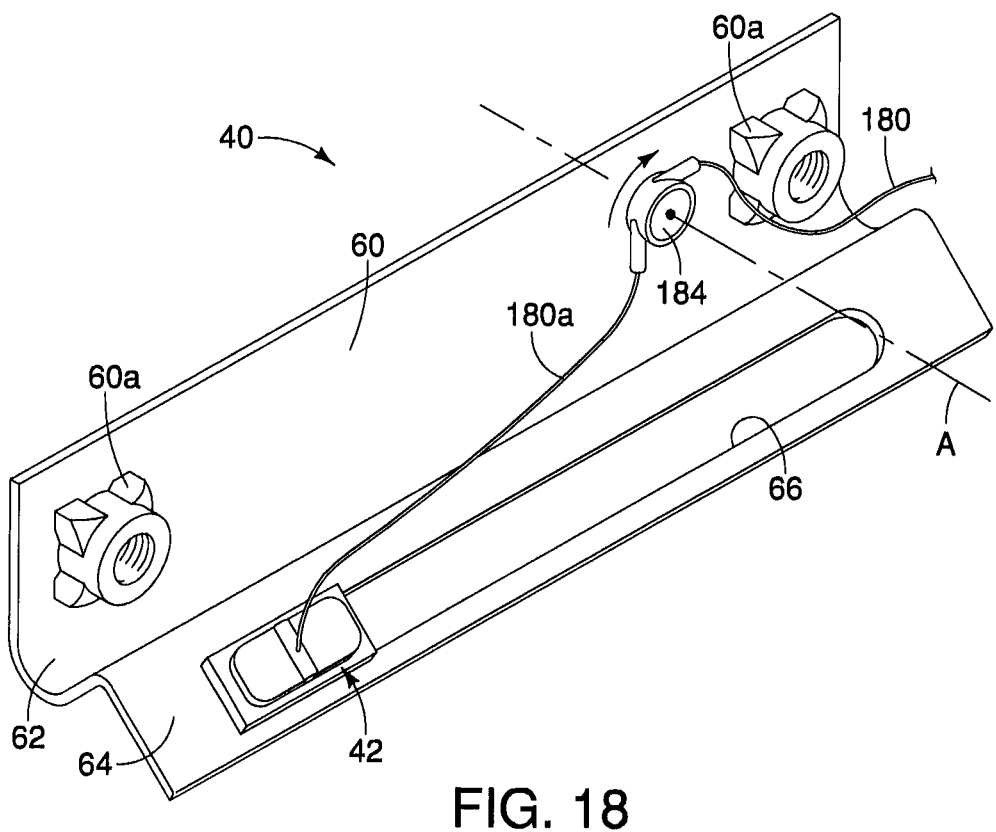
FIG. 18 is another perspective view of the outboard side of the mounting bracket of the lighting system showing the lamp assembly movably installed to the elongated slot at another location and showing the retractable wiring harness in an extended orientation in accordance with the sixth embodiment.

Referring now to FIGS. 17 and 18, a wiring harness 180 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the wiring harness 80 of the first embodiment is replaced with the wiring harness 180. Further, the spindle 84 of the first embodiment is replaced with a winding mechanism 184. As shown in FIGS. 17 and 18, the lamp assembly 42 can be positioned at any of the previously mentioned plurality of locations along the elongated opening 66. When the vehicle operator moves the lamp assembly 42 to a different location along the length of the elongated opening 66, a portion 180a of the wiring harness 180 moves with the lamp assembly 42. The winding mechanism 184 includes an internal reel (not shown) that is spring biased to urge the portion 180a of the wiring harness 180 back into the winding mechanism 184. The winding mechanism 184 is pivotally mounted to the outboard surface of the rail attachment section 60 of the mounting bracket 40, as shown in FIGS. 17 and 18. Specifically, the winding mechanism 184 can pivot about the axis A in response to movement of the lamp assembly 42.

Upon movement of the lamp assembly 42 to the location depicted in FIG. 18, the portion 180a of the wiring harness 180 is easily drawn out of the winding mechanism 184. Further, the portion 180a of the wiring harness 80 is drawn back into the winding mechanism 184 by the biasing of the reel (not shown) within the winding mechanism, as depicted in FIG. 17.

The winding mechanism 184 is a conventional device. Therefore, further description is omitted for the sake of brevity.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "inboard", "outboard", "forward", "rearward", "above", "downward", "vertical", "horizontal", "below" and "transverse" as well as any other similar directional terms refer to those directions of a vehicle equipped with the lighted vehicle cargo area arrangement. Accordingly, these terms, as utilized to describe the present invention should be interpreted relative to a vehicle equipped with the lighted vehicle cargo area arrangement.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A lighted vehicle cargo area arrangement comprising:
   a cargo area wall structure including a first wall surface facing a vehicle cargo area; and
   a lighting system including:
      a rail fixedly coupled to the cargo area wall structure defining an elongated slot and a flange, the elongated slot defining an accessory attachment track along the rail that extends in a longitudinal direction of the rail, the elongated slot being open to and facing inboard toward the vehicle cargo area, the flange extending downward below the elongated slot and at least partially defining a lamp receiving space located laterally between an outboard surface of the rail and the first wall surface and above a lowest edge of the flange,
      a mounting bracket including a rail attachment section, an intermediate section and a lamp attachment section, the rail attachment section being rigidly attached to the flange of the rail within the lamp receiving space at a location spaced apart from the elongated slot of the rail, the intermediate section extending away from the rail and the rail attachment section toward the first wall surface and to the lamp receiving section such that the intermediate section and the lamp attachment section are located within the lamp receiving space above the lowest edge of the flange, and
      a lamp attached to the lamp attachment section and aimed to shine light beneath the mounting bracket and the rail toward the vehicle cargo area, the lamp being located within the lamp receiving space and spaced apart from the rail.

2. The lighted vehicle cargo area arrangement according to claim 1, wherein
   the rail attachment section of the mounting bracket is fixed to the outboard surface of the rail.

3. The lighted vehicle cargo area arrangement according to claim 1, wherein
   the rail attachment section and the lamp attachment section are rigidly fixed to one another.

4. The lighted vehicle cargo area arrangement according to claim 3, wherein
   the rail attachment section extends in a downward direction along the rail and the lamp attachment section extends toward the first wall surface with the mounting bracket installed to the rail.

5. The lighted vehicle cargo area arrangement according to claim 1, wherein
   the mounting bracket includes an intermediate section that extends upwardly from a lower end of the rail attachment section to the lamp attachment section.

6. The lighted vehicle cargo area arrangement according to claim 1, wherein
   the rail attachment section and the lamp attachment section are angularly offset from one another defining an acute angle therebetween.

7. A lighted vehicle cargo area arrangement comprising:
   a cargo area wall structure including a first wall surface facing a vehicle cargo area; and
   a lighting system including:
      a rail fixedly coupled to the cargo area wall structure defining a lamp receiving space located laterally between an outboard surface of the rail and the first wall surface and above a lowest edge of the rail,
      a mounting bracket including a rail attachment section, an intermediate section and a lamp attachment section, the rail attachment section being rigidly attached to the rail, the intermediate section extending away from the flange of the rail and the rail attachment section toward the first wall surface and to the lamp receiving section, the intermediate section including a hinge, the intermediate section, the hinge and the lamp attachment section being located within the lamp receiving space above the lowest edge of the flange, and the lamp attachment section and hinge are spaced apart from the rail and the rail attachment section of the mounting bracket, and
      a lamp attached to the lamp attachment section and aimed to shine light beneath the mounting bracket and the rail toward any one of a plurality of areas within the vehicle cargo area in response to movement of the lamp attachment section of the mounting bracket about the hinge.

8. The lighted vehicle cargo area arrangement according to claim 1, wherein
   the lamp attachment section is movably coupled to the rail attachment section.

9. The lighted vehicle cargo area arrangement according to claim 1, wherein
   the lamp is adjustably mounted to the lamp attachment section of the mounting bracket such that the lamp can be positioned at any one of a plurality of locations along a horizontal length of the lamp attachment section of the mounting bracket.

10. The lighted vehicle cargo area arrangement according to claim 9, wherein the lamp attachment section of the mounting bracket includes an elongated slot with the lamp being positioned at any one of the plurality of locations along the elongated slot.

11. The lighted vehicle cargo area arrangement according to claim 7, wherein
the rail defines an elongated slot that extends in a longitudinal direction of the rail, the slot being open to the vehicle cargo area, the elongated slot at least partially defining an accessory attachment track along the rail, the rail having a flange extending downward from the accessory attachment track, the rail attachment section of the mounting bracket being fixedly attached to the flange of the rail.

12. The lighted vehicle cargo area arrangement according to claim 1, wherein
the lamp attachment section of the mounting bracket includes a plurality of lamp openings and a plurality of lamps, and each one of the plurality of lamp openings have a corresponding one of the plurality of lamps installed thereto.

13. The lighted vehicle cargo area arrangement according to claim 1, wherein
the lighting system further includes a controller and a wiring harness installed to the outboard surface of the mounting bracket, with the wiring harness being electrically connected to the lamp and the controller.

14. The lighted vehicle cargo area arrangement according to claim 13, wherein
the wiring harness includes a retracting section that moves from a retracted orientation to an extended orientation in response to corresponding movement of the lamp.

15. The lighted vehicle cargo area arrangement according to claim 1, wherein
the lamp attachment section of the mounting bracket includes a plurality of lamp openings and a plurality of lamps, and each one of the plurality of lamp openings have a corresponding one of the plurality of lamps installed thereto.

16. The lighted vehicle cargo area arrangement according to claim 1, wherein
the lighting system further includes a controller programmed to limit operation of the lamp upon detection of a vehicle running condition.

17. A lighted vehicle cargo area arrangement comprising:
a cargo area wall structure including a first wall surface facing a vehicle cargo area; and
a lighting system including:
a rail fixedly coupled to the cargo area wall structure defining a lamp receiving space located laterally between an outboard surface of the rail and the first wall surface and above a lowest edge of the rail,
a mounting bracket including a rail attachment section, an intermediate section and a lamp attachment section, the rail attachment section being rigidly attached to the rail, the intermediate section extending away from the rail and the rail attachment section toward the first wall surface and to the lamp receiving section, the intermediate section and the lamp attachment section being located within the lamp receiving space above the lowest edge of the flange, the lamp attachment section having an inboard surface and an outboard surface with an elongated slot extending through the lamp attachment section from the inboard surface to the outboard surface, the lamp attachment section and the elongated slot being spaced apart from the rail and the rail attachment section of the mounting bracket,
a lamp housing attached to the lamp attachment section and aimed to shine light beneath the mounting bracket and the rail toward the vehicle cargo area, the lamp housing having a projection with an open end and a lamp within the lamp housing that emits light through the open end of the projection, the lamp housing being located within the lamp receiving space along the outboard surface of the mounting bracket and the projection extending through the elongated slot to the inboard surface of the mounting bracket with the lamp being positioned at any one of a plurality of locations along the elongated slot, and
an attachment member located in its entirety along a portion of the inboard surface of the mounting bracket and being fixed to the projection attaching the lamp housing to the mounting bracket.

18. The lighted vehicle cargo area arrangement according to claim 17, wherein
the rail defines an elongated slot that extends in a longitudinal direction of the rail, the slot being open to the vehicle cargo area, the elongated slot at least partially defining an accessory attachment track along the rail, the rail having a flange extending downward from the accessory attachment track, the rail attachment section of the mounting bracket being fixedly attached to the flange of the rail.

19. The lighted vehicle cargo area arrangement according to claim 17, wherein
the lamp attachment section of the mounting bracket is connected to the mounting bracket by a swivel joint such that the lamp is adjustably aimed at various locations within the vehicle cargo area.

\* \* \* \* \*